UNITED STATES PATENT OFFICE.

ANDREW PETERS, OF BROOKLYN, NEW YORK.

BAKING-POWDER.

SPECIFICATION forming part of Letters Patent No. 315,830, dated April 14, 1885.

Application filed May 20, 1884. (No specimens.)

*To all whom it may concern:*

Be it known that I, ANDREW PETERS, a citizen of the United States, residing at the city of Brooklyn, county of Kings, State of New York, have invented a new and useful Improvement in Baking-Powders, of which the following is a specification.

My invention consists in the production of a baking-powder in which boracic anhydride forms an essential ingredient. Ordinary boracic acid cannot be used with the ordinary carbonate of an alkali in the formation of a baking-powder because of its tendency to act spontaneously upon the other ingredients.

The borates have hitherto been considered by some as having a deleterious effect upon the system when used constantly; but there is as good authority for a contrary theory, and perhaps better.

The United States Dispensatory, fourteenth edition, under this title, characterizes boracic acid as being a "mild refrigerant," and Dumas and Bedouin, referred to by Muspratt, (Chemie,) pages 445 and 446, fifth volume of third edition, (German,) "Saures," are authority to the same effect. I have discovered, however, that the anhydrides of boracic acid may be used without the difficulty referred to. In making my baking-powder I proceed as follows: I take ordinary boracic acid ($BO_3H_3$) and dry it at 100° centigrade, more or less, whereby a portion of the water is driven off and it is converted into an anhydride. In this condition the boracic anhydride can be used in the formation of baking-powders as a substitute for cream of tartar.

The proportions of the ingredients which may be used in a baking-powder are about as follows: one hundred and seventy-six parts, by weight, boracic anhydride, ($BHO_2$;) one hundred and sixty-eight parts, by weight, bicarbonate of soda, ($NaH,CO_3$.) These proportions would be varied in case other anhydrides of boracic acid should be used than the particular one named. I also prefer to add to the anhydride named, although not necessarily, three hundred parts, by weight, of starch, or one hundred and fifty parts, by weight, of carbonate of magnesia.

My baking-powder is in the condition of a dry powder, and while in this state it will practically remain unchanged and will keep for a long time; but when used in baking the liquid and heat which are used in the operation cause the boracic anhydride to attack the bicarbonate of soda, and thereby liberate the carbonic-acid gas, which raises the dough.

My baking-powder is put up in cans, cases, packages, or bottles, and is employed by adding it to the flour in the proportions of about two tea-spoonfuls of baking-powder to one quart of flour, one tea-spoonful salt, one-half tea-spoonful sugar, and one and one-half pint milk; but of course some of the above ingredients may be omitted or the proportions varied with perfectly good results.

I do not limit myself to the exact proportions of the ingredients in my baking-powder, nor to the particular anhydride or the particular carbonate used.

I claim—

A baking-powder composed, essentially, of a boracic anhydride and a carbonate of an alkali, in substantially the proportions specified.

ANDW. PETERS.

Witnesses:
DANIEL H. DRISCOLL,
EDWARD T. ROCHE.